(12) United States Patent
Malden

(10) Patent No.: US 9,798,709 B2
(45) Date of Patent: Oct. 24, 2017

(54) DIGITAL TRANSACTION WORKSPACE WITH INTELLIGENT NOTIFICATION

(71) Applicant: DocuSign, Inc., San Francisco, CA (US)

(72) Inventor: Matt Malden, San Francisco, CA (US)

(73) Assignee: DocuSign, Inc., San Francisco, CA (US)

( * ) Notice: Subject to any disclaimer, the term of this patent is extended or adjusted under 35 U.S.C. 154(b) by 0 days.

(21) Appl. No.: 14/610,122

(22) Filed: Jan. 30, 2015

(65) Prior Publication Data

US 2016/0170950 A1 Jun. 16, 2016

Related U.S. Application Data

(60) Provisional application No. 62/092,173, filed on Dec. 15, 2014.

(51) Int. Cl.
*G06K 9/00* (2006.01)
*G06F 17/24* (2006.01)
*H04L 29/08* (2006.01)
*G06Q 20/38* (2012.01)

(52) U.S. Cl.
CPC ............ *G06F 17/241* (2013.01); *H04L 67/10* (2013.01); *G06Q 20/3821* (2013.01); *G06Q 20/3825* (2013.01)

(58) Field of Classification Search
CPC ................... G06Q 20/3821; G06Q 20/3825
See application file for complete search history.

(56) References Cited

U.S. PATENT DOCUMENTS

| 5,862,327 | A  | * | 1/1999 | Kwang | G06F 11/1474 |
| --- | --- | --- | --- | --- | --- |
|  |  |  |  |  | 707/999.01 |
| 8,055,523 | B2 | * | 11/2011 | Finke | G06Q 10/06 |
|  |  |  |  |  | 705/7.13 |
| 8,078,512 | B1 | * | 12/2011 | Haberaecker et al. | 705/35 |
| 8,108,436 | B2 | * | 1/2012 | Chhatrapati | G06F 17/30471 |
|  |  |  |  |  | 705/7.18 |

(Continued)

FOREIGN PATENT DOCUMENTS

| WO | WO-2013142439 A1 | 9/2013 |
| --- | --- | --- |
| WO | WO-2016099586 A1 | 6/2016 |

OTHER PUBLICATIONS

"International Application Serial No. PCT/US2015/013769, International Search Report dated Nov. 19, 2015", 2 pgs.

(Continued)

*Primary Examiner* — Stephen R Koziol
*Assistant Examiner* — Jonathan S Lee
(74) *Attorney, Agent, or Firm* — Schwegman Lundberg & Woessner, P.A.

(57) ABSTRACT

A digital transaction management service provides notice to a recipient regarding one or more actions to take with respect to one or more transactions. The digital transaction management service is configured to determine that there is a new action required by the recipient and to send a new notice only if the recipient has accessed the digital transaction management service since the time the last notice was sent. Reminder notices are sent only if there has been no additional notice sent regarding any action for any transaction during a preset period of time.

16 Claims, 11 Drawing Sheets

(56) References Cited

U.S. PATENT DOCUMENTS

| | | | |
|---|---|---|---|
| 8,291,453 B2* | 10/2012 | Boortz | H04N 5/44543 725/135 |
| 8,572,388 B2* | 10/2013 | Boemker | G06Q 10/10 705/64 |
| 2002/0091927 A1* | 7/2002 | Wall | G06Q 20/3674 713/176 |
| 2003/0004917 A1* | 1/2003 | Thomas | H04L 29/06 |
| 2004/0083119 A1* | 4/2004 | Schunder | G06Q 10/10 705/1.1 |
| 2005/0102607 A1* | 5/2005 | Rousselle | G06Q 10/109 715/234 |
| 2005/0108536 A1* | 5/2005 | Karimisetty | G06F 21/6227 713/176 |
| 2005/0108537 A1* | 5/2005 | Puri et al. | 713/176 |
| 2007/0033078 A1 | 2/2007 | Mandalia et al. | |
| 2007/0244793 A1 | 10/2007 | Boesel | |
| 2008/0086642 A1* | 4/2008 | Takahashi | 713/176 |
| 2009/0119159 A1* | 5/2009 | Reardon | G06Q 20/10 705/40 |
| 2011/0093713 A1* | 4/2011 | Blot-Lefevre | 713/175 |
| 2011/0276396 A1* | 11/2011 | Rathod | G06F 17/30867 705/14.49 |
| 2011/0314371 A1* | 12/2011 | Peterson et al. | 715/234 |
| 2012/0030505 A1* | 2/2012 | Chhatrapati | G06F 17/30471 714/4.12 |
| 2014/0188725 A1* | 7/2014 | Reardon | G06Q 40/00 705/44 |

OTHER PUBLICATIONS

"International Application Serial No. PCT/US2015/013769, Written Opinion dated Nov. 19, 2015", 5 pgs.

* cited by examiner

*400*

Document History

Date created: 12/1/2014

Owner: Bob Jones

| Action / Participant | Action Date |
|---|---|
| Document signed (View)<br>- by Sally Smith | 10/22/2014<br>4:39 PM |
| Document signed (View)<br>- by Ralph Adams | 10/20/2014<br>11:14 PM |
| Document modified (View)<br>- by Bob Jones | 10/18/2014<br>2:08 PM |
| Document Emailed<br>- by Joe Richardson | 10/16/2014<br>12:05 PM |
| Document modified (View)<br>- Joe Richardson | 10/16/2014<br>12:04 PM |
| Document signed (View)<br>- by Sally Smith | 10/16/2014<br>9:41 AM |
| Document Emailed<br>- by Bob Jones | 10/15/2014<br>3:20 PM |
| Document Created (View)<br>- by Bob Jones | 10/15/2014<br>3:15 PM |

402

404

NEXT    BACK

Warning – Unassigned Roles

The following signing roles do not have a recipient associated with them. Would you like to proceed without having recipients associated with these signing roles?

Signing Role

Seller Two

Listing Broker

[CONTINUE]   [BACK]

Warning – Unassigned Roles

The following documents require signatures for at least one signing role, but recipients have not been associated with a required signing role. Would you like to proceed?

Documents

DOC_2

DOC_5

[CONTINUE]   [BACK]

*FIG. 6B*

Note that at least one document in this transaction is not pre-tagged for eSignature while others are pre-tagged. Please pay special attention to make sure all of the documents are tagged appropriately for eSignature before sending the documents out to be signed electronically.

| Document | Pre-tagged? |
|---|---|
| DOC_1 | |
| DOC_2 | Yes |
| DOC_3 | |
| DOC_4 | |
| DOC_5 | Yes |

CONTINUE    BACK

*FIG. 6C*

DIGITAL TRANSACTION WORKSPACE WITH INTELLIGENT NOTIFICATION

PRIORITY CLAIM

This application claims the benefit of prior U.S. provisional application Ser. No. 62-092173, filed Dec. 15, 2014, the contents of which are incorporated by reference.

FIELD OF THE INVENTION

The present disclosure relates generally to document management and, more particularly, to managing and providing notice of documents requiring review and electronic signature in a digital transaction management service.

BACKGROUND

The use of electronic signatures to sign documents has greatly increased in the past few years. Electronic signatures can allow multiple parties in a transaction to efficiently sign documents from remote locations, while maintaining confidence that the party signing the document is the actual signer. In some instances, multiple documents are applicable to a particular transaction, and therefore one or more individuals must sign many documents. In addition, in some instances the multiple documents are not all available at the same time, but rather some of the documents are created separately from one another and at different points in time. This may cause each participant to receive a series of notifications regarding the addition of new documents and the presence of old documents that remain unsigned. In some cases, the notifications may be redundant or may cause confusion if the recipient believes it is a notice for a document that has already been reviewed or signed. With this in mind, the present invention is directed to an improved system for such notifications.

BRIEF DESCRIPTION OF THE DRAWINGS

Preferred and alternative examples of the present invention are described in detail below with reference to the following drawings. In the drawings, like reference numerals refer to like components throughout the various figures unless otherwise specified.

FIG. 4 shows an illustration of an example screenshot of a document's history in a workspace;

FIGS. 6A, 6B and 6C show illustrations of example screenshots of unassociated signing roles and corresponding documents in a workspace;

DETAILED DESCRIPTION

Various embodiments are described more fully hereinafter with reference to the accompanying drawings, which form a part hereof, and which show, by way of illustration, specific embodiments by which the invention may be practiced. The inventions may, however, be embodied in many different forms and should not be construed as limited to the embodiments set forth herein. Among other things, the various embodiments may be methods, systems, media, or devices. Accordingly, the various embodiments may be entirely hardware embodiments, entirely software embodiments, or embodiments combining software and hardware aspects. The following detailed description should, therefore, not be limiting.

Briefly stated, embodiments are directed towards facilitating a digital transaction between at least two users, and particularly in which a plurality of documents is involved. At least one document may be assigned or otherwise uploaded to a workspace associated with an electronic signature service. The workspace provides a plurality of participants controlled access and editing to the at least one document based on a role of each of the plurality of participants. In some embodiments, the at least one document may be received from an owner participant at a first web-based service, wherein the at least one document is editable through the first web-based service. The at least one document may be linked to the workspace at the electronic signature service, wherein the electronic signature service maintains non-editable copies of the at least one document, tags a copy of the document for signature, and provides the tagged document copy to at least one signing user.

In some embodiments, it may be determined if the tagged document includes at least one pre-tagged signing role that is unassociated with a signing user. In response to this determination, a report may be provided to the user identifying the determination of an unassociated pre-tagged signing role. In some embodiments, a history of the document may be provided to a participant. The history may list each action associated with the document and a reference to a snapshot copy of the document obtained in response to a corresponding action. In at least one embodiment, deletion of the document may result in deletion of all document copies.

The brief description of the invention is intended to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detail description this is presented later.

Example Computing System Implementation

Figure 1:
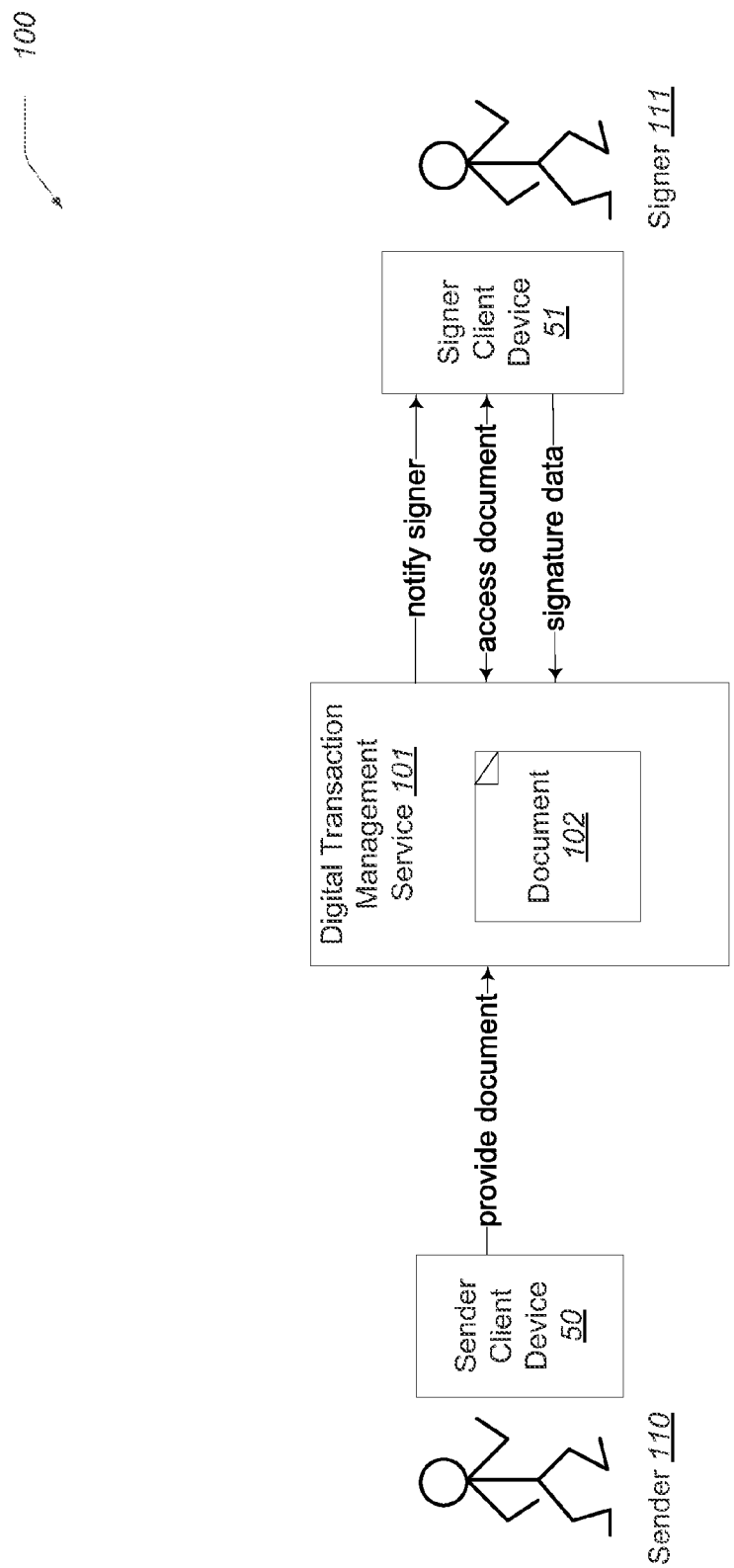
FIG. 1 is a block diagram of an example embodiment of a digital transaction management service.

FIG. 1 is a block diagram of an example embodiment of a digital transaction management service. In particular, FIG. 1 depicts a system 100 for facilitating electronic signatures between users. Digital Transaction Management Service (DTMS) 101 provides an electronic signature capability. The DTMS 101 is utilized by a sender user 110 and one or more signing users 111 to facilitate an electronic signing of one or more recipients of a signature document.

The DTMS 101 facilitates the creation of electronic signature documents and the association of electronic signatures therewith. In the illustrated scenario, the sender 110 operates a sender client device 50 in order to provide (e.g., upload, transmit) an electronic document 102 (e.g., an invoice, contract, purchase order, agreement) to the DTMS 101. The sender 110 typically also provides additional information to the DTMS 101, such as the identity or contact information (e.g., email address) of the signer 111, an indication of signature data (e.g., signatures, initials, dates) that are to be collected from the signer 111, and the like. The DTMS 101 then securely stores the received document 102 and additional information.

The signer 111 then accesses the document 102. Typically, the sender 110 notifies the signer 111, such as by causing the DTMS 101 to send to the signer 111 a message (e.g., an email) that includes a reference (e.g., a URL) or other indicator that can be used to access the document 102. The DTMS 101 retrieves the document 102 from secure storage and provides it (or a representation thereof) to the signer client device 51 for presentation. The signer 111 operates a Web browser or other client module (e.g., mobile app) executing on the signer client device 51 to access and review the document 102. When the document 102 has been reviewed to the satisfaction of the signer 111, the signer attaches (or provides an indication or instruction to attach) his electronic signature to the document 102. Once the signing has been completed, the DTMS 101 stores the document 102 in association with signature data and any other evidence of the signing that needs be retained, such as user information, timestamps, and the like.

Once the signer 111 has signed the document 102, the DTMS 101 typically notifies the sender 110 that the document has been signed. For example, the DTMS 101 may transmit (e.g., in an email) a URL, link, or other identifier of the document 102 to the sender client device 50. The sender 110 can then use a browser or other client logic executing on the sender client device 50 to access the signed document on the DTMS 101.

The DTMS 101 may perform other or additional functions. For example, the DTMS 101 may provide a workspace, as described herein, where participants can view, access, and edit documents assigned to the workspace. The DTMS 101 may maintain copies of documents based on actions associated with the documents such that snapshots of the document may be obtained to preserve the document as provided to a recipient of the transaction. The DTMS 101 may also maintain pre-tagged documents such that upon association of a recipient with a signing role, the documents may be automatically tagged for electronic signature based on the signing roles of the pre-tags.

Figure 2:
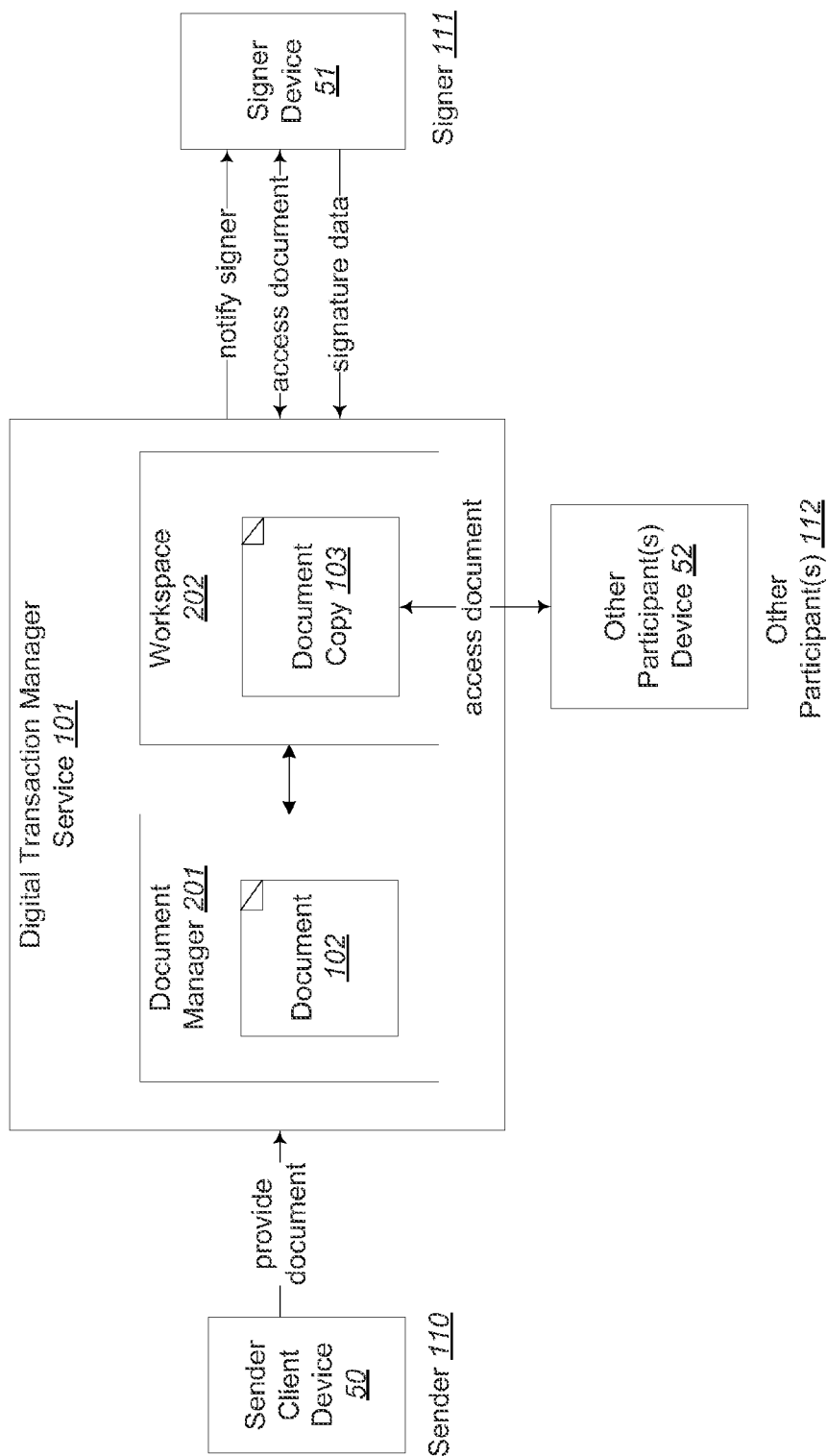
FIG. 2 is a block diagram of an alternative example embodiment of a digital transaction management service.

FIG. 2 is a block diagram of an alternative example embodiment of a digital transaction management service. System 200 may be an embodiment of system 100 of FIG. 1. In this alternative embodiment, DTMS 101 may include a document manager 201 and a workspace 202. The document manager 201 may be a service (e.g., a web-based service) that can enable one or more participants to create, view, access, and/or edit document 102. Although illustrated as a single document, document 102 may include a plurality of documents. Likewise, the plurality of documents 102 may be created or uploaded to the document manager 201 at the same time or at different times. In some embodiments, a document owner or other permitted participants may have access to the document manager 201, while some participants may not have access to document 102 in the document manager 201.

The workspace 202 may be a service that enables one or more participants 112 to view, access, and/or edit documents for electronic signatures by one or more recipients. In some embodiments, a workspace may also be referred to as a transaction room. A participant operates other participant client device 52 in order to view and/or access documents. In various embodiments, the other participants 112 may include sender 110, signer 111, and/or other participants in the workspace who may or may not be sending or signing documents but still require access. For example, in the real estate transaction context, an office assistant in a real estate office may require access to documents related to the purchase and sale of a house (e.g., agreements, disclosures, notices), but would ordinarily not need the ability to send or sign such documents.

In various embodiments, a document owner may link the documents 102 from document manager 201 to the workspace 202. In the workspace, a participant can tag a document for electronic signature by one or more signers 111 (who may also be referred to as a recipient of a transaction). In some embodiments, a participant may be enabled to associate one or more participants (i.e., one or more recipients) with one or more signing roles. These signing roles may be employed to automatically tag the document with electronic signature tags based on pre-tags and their corresponding signing roles.

As described herein, the document manager 201 may maintain editable versions of the documents (e.g., to allow a user to edit the content of the document), while the workspace 202 may maintain non-editable copies (e.g., cannot edit the underlying content of the document but can add, remove, or edit tags for electronic signatures) of the documents and update the copies accordingly. In some instances, the workspace may also maintain both editable and non-editable versions of the documents. In various embodiments, the document manager 201 may be a workspace with editable documents, while workspace 202 may be a workspace with non-editable document copies (e.g., prepared for electronic signature).

In particular, the workspace 202 may make and maintain copies of the document 102, such as copy 103. Copies are created by the workspace 202 in response to various types of triggering conditions. For example, an agent or broker acting as one of the participants 112 may make an edit to a purchase agreement, modifying the purchase price or some other term. When this purchase agreement is shared with, for example, the signer 111, the workspace 202 creates and stores a copy of the purchase agreement as document copy 103. When the signer 111 accesses the shared document, the signer 111 will see the document copy 103, which reflects the state of the document 102 at the time it was shared. Note that between the time the modified document was shared and the time at which the signer 111 accesses the document, the document 102 may have been again modified. In such a case, the signer 111 will also access the document copy 103, reflecting the state of the document 102 at the time it was shared, and not the current version of the document 102.

In some embodiments, the document manager 201 is hosted or operated by a party or organization that is distinct and/or separate from the party or organization that hosts the digital transaction management service 101. For example, in a real estate transactions context, the document manager 201 may be hosted by a system that specializes in preparing and organizing real estate transaction documents, including purchase and sale agreements, broker agreements, disclosures, and the like.

Figure 3:
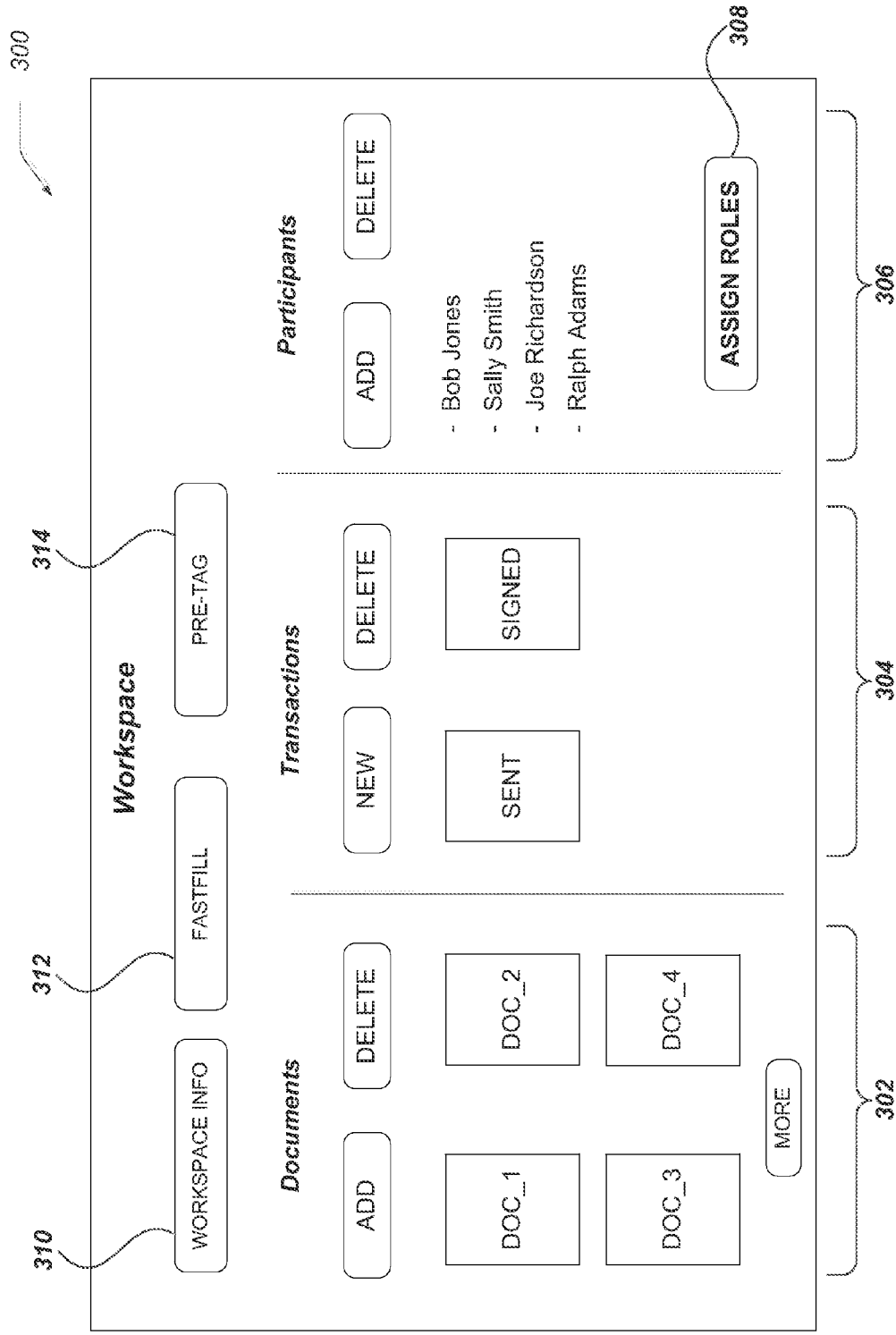
FIG. 3 shows an illustration of an example screenshot of a workspace.

FIG. 3 shows an illustration of an example screenshot of a workspace. Screenshot 300 may include a plurality of different types of information that may be accessible in a workspace. For example, the workspace may include buttons that may open another window or screen where a user can add transaction information (e.g., button 310), fast fill information (e.g., button 312), pre-tag information (e.g., button 314), or the like. Transaction information may include generic information about the transaction. Fast fill information may include information that can be auto-filled into one or more documents. And pre-tag information may enable a participant to add or define pre-tags for one or more documents.

Documents 302 may include thumbnails of one or more documents that have been assigned to the workspace. In various embodiments, a participant may be enabled to add or delete documents (noting that deleting may be reserved to an owner of the document or participants with particular permissions) or may access a document by clicking on the thumbnail. In some embodiments, clicking on a document thumbnail may open a window or screen that shows a history of actions on a document (e.g., as shown in FIG. 4).

Transactions 304 may include thumbnails of one or more transactions of documents prepared for electronic signature by one or more recipients (who are participants in a workspace). A transaction is an electronic container (e.g., data structure, record) that is used to organize documents and related information (e.g., sender and signer identity information, signature event information) for purposes of gathering electronic signatures. In various embodiments, a participant may be enabled to add or delete transactions (noting that deleting may be reserved to an owner or creator of the transaction or participants with particular permissions) or may access a transaction by clicking on the thumbnail.

Participants 306 (which may be, for example, sender 110, signer 111, and others) may include a list of each participant in the workspace. In various embodiments, each participant may have one or more permissions regarding which documents and/or transactions they can access, add, delete, edit, or the like.

In some embodiments, one or more participants may be assigned or otherwise associated with one or more signing roles. These participants may be referred to as recipients. Clicking on button 308 may open another window or webpage such that the recipients can be associated with signing roles, such as the examples shown in FIGS. 5A and 5B.

FIG. 4 shows an illustration of an example screenshot of a document history in a workspace. As described herein, a copy of the document may be maintained based on an action associated with the document. Example 400 illustrates a list of previous actions for a particular document. The example includes a plurality of actions 402 that have been performed on the document by various participants in the workspace. Based on the action, a copy of the document may be maintained, such that it can be accessed later (e.g., by click on the "view" link). For example, if the document has changed since it was last copied, a new current copy may be obtained and made accessible in the document's history.

Figure 5A:
FIGS. 5A and 5B show illustrations of example screenshots of the association of recipients and signing roles in a workspace.
Figure 5B:

FIGS. 5A and 5B show illustrations of example screenshots of the association of recipients and signing roles in a workspace. Examples 500A and 500B of FIGS. 5A and 5B, respectively, may enable a participant to establish or associate recipients with one or more signing roles. For example, pull-down menus 504 may enable the participant to select which recipient is associated with which signing role 502. In various embodiments, recipients may be participant in the workspace. In some embodiments, permissions of the participants may indicate which participants assign signing roles to other participants.

FIGS. 6A, 6B and 6C show illustrations of example screenshots of unassociated signing roles and corresponding documents in a workspace. As described herein, a document may be pre-tagged for one or more signing roles. If a pre-tagged signing role is not associated with a recipient (e.g., as shown in FIG. 5B), then a list of unassociated signing roles may be listed, which is illustrated in FIG. 6A.

In other embodiments, the documents that have unassociated pre-tag signing roles may be listed. FIG. 6B shows one example of such a list. An alternative illustration in FIG. 6C lists each document in the workspace and whether or not it has unassociated signing roles. In various embodiments, the list of documents may be generated prior to or after the document is automatically tagged based on the pre-tagged signing roles.

Example Processes

As noted above, any particular event may comprise one or more transactions, and each of the one or more transactions may comprise a plurality of documents 302, such as illustrated in FIG. 3. In one version of the invention, an email notice is sent to each of the recipients, or to those recipients who are asked to sign or take other action with respect to a workspace. In an instance in which there are several transactions applicable to an event, this notification process may include a separate email notice for each of the plurality of transactions. As a result, the recipients may receive several notifications for a single event, and the notifications may be sent closely after one another such that the recipient perceives them as a nuisance or in which the recipient is confused about whether the notices are for the same or different transactions, or whether the notices are merely redundant. Accordingly, in a preferred version of the invention a more intelligent notification process is used for workspace transactions.

Figure 7:
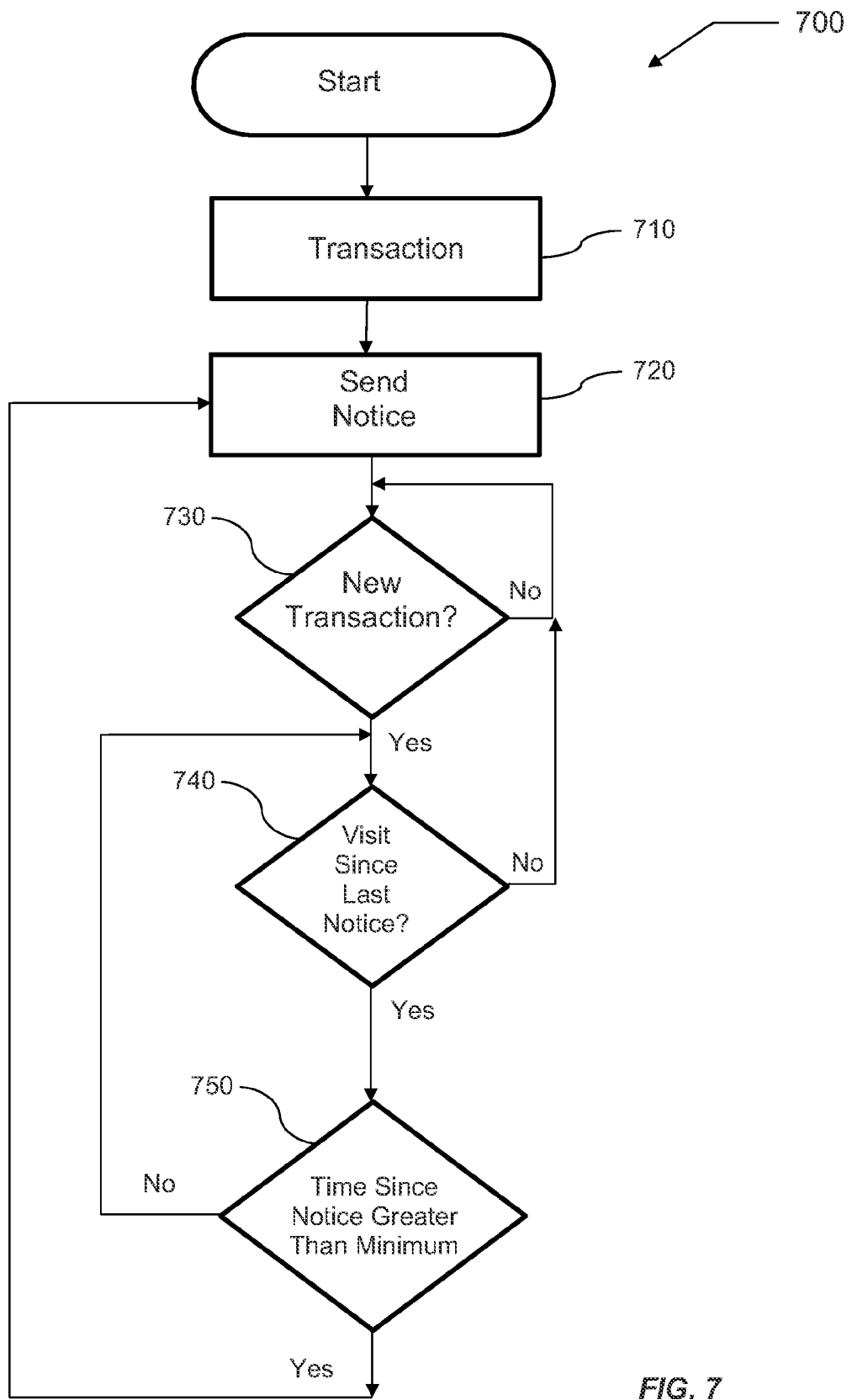
FIG. 7 illustrates a logical flow diagram generally showing one embodiment of a process for providing intelligent notification of transactions.

The operation of a preferred method for providing a notification for transactions is illustrated in FIG. 7, which illustrates process 700. The process 700 begins at a start block and proceeds to block 710 in which one or more transactions are associated with a workspace. In a preferred version, at block 710 the one or more transactions is created at substantially the same time. Once the transaction is initiated at block 710, the process proceeds to block 720 in which a notification is sent to one or more recipients. The form of notification is substantially as described above, and in a preferred version the notification is in the form of an email notice sent to the individuals associated with the transaction, particularly including those who must sign or take other action with respect to the transaction.

After the notice is sent at block 720, the process continues to decision block 730 where it evaluates whether any new transactions have been associated with the workspace. If not, the process loops back to decision block 730 to continue to monitor for the association of new transactions.

If a new transaction has been associated with the workspace, the process continues to a further decision block 740, which evaluates whether the particular recipient has visited the workspace since the time of the last notification. In general, this version of the invention recognizes that if a recipient has already received a notice but has not acted upon it, then there is no need to send the recipient another notice when a subsequent transaction is created. In the preferred version, the access information sent to the recipients in the notification will direct the recipient to the pre-signing page (see FIG. 8) associated with the workspace, rather than to a single transaction, and at that pre-signing page the recipient will see all of the transaction that are awaiting signature. Accordingly, when a recipient visits the pre-signing page in response to receipt of the earlier notification, the recipient will see the original transaction that was the subject of the first notification, as well as the new transaction. Thus, if the recipient has not visited the workspace in response to the last notification then no further notification is sent and the process again returns to decision block 730 described above.

If the recipient has visited the workspace since the last notice, the process proceeds to decision block 750 to evaluate whether the amount of time since the last notification was sent is greater than a desired length of time. In one example of the invention, the comparison length of time is defaulted to 24 hours, but this value can be adjusted by those having proper access in the workspace. Accordingly, at decision block 750 the process evaluates whether it has been more than the preset amount of time since the last notice was sent. If less than the preset length of time (that is, by default, 24 hours) has passed then the process returns to decision block 740 to continue the stepwise evaluation of whether the recipient has visited since the last notice and whether the preset amount of time has passed. As this loop continues, once the preset amount of time has passed (for example, 24 hours) without the recipient having visited the workspace, the process will proceed to block 720 where a further notification will be sent.

In a preferred version of the invention, notifications are sent from a recipient having an account that is designated as a sender. The recipient is directed to a pre-signing page related to a set of transactions associated with the sender, with a distinct pre-signing page being configured for each set of transactions sent from a single sender account (such as a group of users who work for a company). Different notification recipients will be directed to different pre-signing pages, in which the system presents tailored pre-signing pages containing the content applicable to the particular participant. Likewise, the recipient will be directed to different pre-signing pages associated with transactions from different senders.

Figure 8:
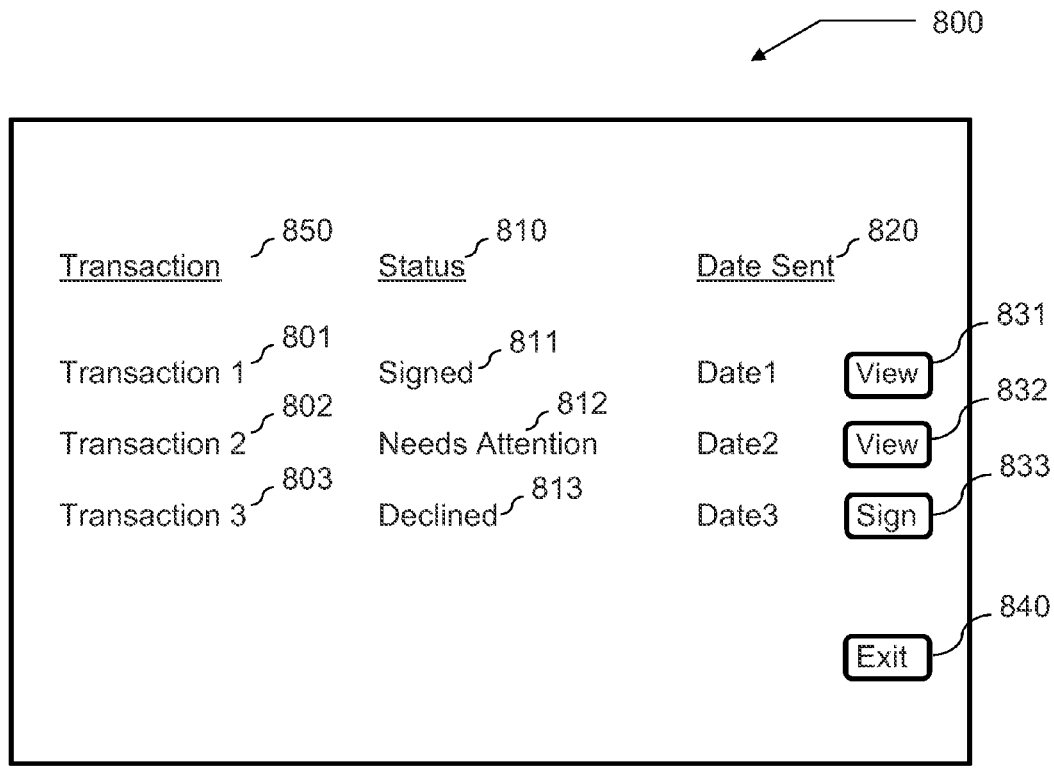
FIG. 8 illustrates an example screen display of a workspace and status of transactions in the workspace.

FIG. 8 is a screen display 800 for a representative pre-signing page associated with a transaction. The notifications, as described above, preferably include an access code and direct the user to the applicable pre-signing page associated with the transaction. In one version, the notification includes a hyperlink or Uniform Resource Locator directing the recipient to a pre-signing page associated with the workspace. At the pre-signing page, the recipient may select a particular transaction for signature and in the event the transaction requires an access code the recipient may enter the applicable access code that will enable further access to the transaction. In other versions, the user may sign one or more transactions without entry of an access code.

In the illustrated example, a particular pre-signing page may include a plurality of transactions under a transactions heading 850, and in this case three transactions 801, 802, 803 are shown. Each transaction has a status under a status heading 810 which indicates the current status of the transaction. In the illustrated example, the transactions are shown as signed 811, needing attention 812, and declined 813. Additional status indicators may be used, depending on the nature of the transaction and the recipient activity required. A time status indicator is provided under a date sent heading 820, indicating the date the transaction notice was sent to the recipient.

In each case, a button 831, 832, 833 is provided in the row corresponding to each separate transaction. Preferably the button includes an indicator signaling to the recipient that selection of the button will enable the recipient to take action with respect to the transaction. In the illustrated example, selection of the action button 831, 832, 833 will take the user to the applicable page showing (for example) a document to be reviewed and signed, or to a page to view the transaction, as applicable. In the illustrated example the action buttons 831, 832, 833 are represented as a "sign" button with respect to Transaction 3 and "view" buttons for Transaction 1 and Transaction 2, but it should be appreciated that selection of the action button may enable the user to fill out a form, approve or decline a request, or take other actions that may or may not include providing a signature or merely viewing the transaction. When the user exits the signing activity, the system returns to the pre-signing page 800.

A further completion button 840 is provided on the pre-signing page. The completion button may include a label such as "exit" or "finish later" to indicate that selection of the completion button will enable the user to log off or otherwise exit the system.

The preferred method and system may further allow for reminder notices to be sent in the case in which there are transactions still needing action. As with the principles of the notification process described above, the preferred reminder system is designed to avoid redundant reminders or reminder notices that are sent too quickly after a recent notification for a new transaction or for some other purpose that would also direct the recipient to the workspace.

Figure 9:
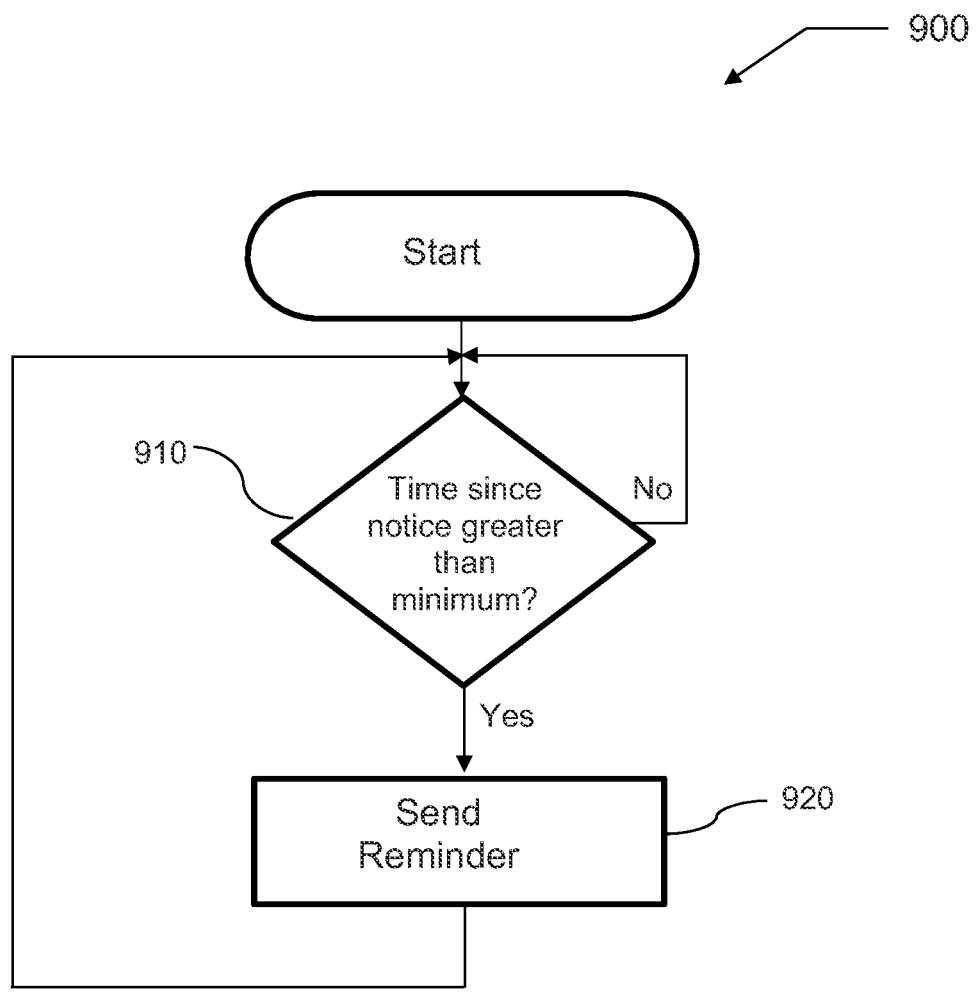
FIG. 9 illustrates a logical flow diagram generally showing one embodiment of a process for providing intelligent reminder notification of transactions.

The operation of a preferred method for providing reminder notifications for transactions is illustrated in FIG. 9, which illustrates process 900. The process 900 begins at a start block and proceeds to decision block 910 in which the process evaluates the amount of time since the last notification was sent. In the preferred case, this evaluation considers all notifications to a recipient that would direct the recipient to the pre-signing page, including for example prior reminders and notices of new transactions that are posted. Most preferably, the reminder period can be specified for each transaction in a workspace, and further in which recipients may set the reminder duration separately for each transaction.

In block 910, the process evaluates the amount of time since the last notification was sent, and compares that amount with the shortest reminder duration that is specified by a recipient for any transaction in the workspace still needing attention. If the length of time without a notification is less than the smallest set reminder duration, the process returns to decision block 910 in a loop until the duration is exceeded.

In other versions of the invention, the particular query of block 910 may vary. For example, in one version the process evaluates the amount of time that has passed since a particular transaction notice was sent to the recipient. If that amount of time exceeds a preset amount then the system proceeds to block 920 to send a reminder notice. In yet other versions, the process evaluates other criteria, such as the passage of time since the occurrence of other important events, sending reminders only after the set time has elapsed or only after such other triggering event has occurred.

Once the length of time without a notification exceeds the smallest set reminder duration for an outstanding transaction, the process proceeds to block 920 where a reminder notification is sent to the recipient or recipients. Thereafter, the process returns to decision block 910. Most preferably, process 700 and process 900 are operating together, allowing for reminder notifications and initial transaction notifications in a manner that reduces redundancy and minimizes the number of notifications being sent.

It should be understood that the embodiments described in the various flowcharts may be executed in parallel, in series, or a combination thereof, unless the context clearly dictates otherwise. Accordingly, one or more blocks or combinations of blocks in the various flowcharts may be performed concurrently with other blocks or combinations of blocks. Additionally, one or more blocks or combinations of blocks may be performed in a sequence that varies from the sequence illustrated in the flowcharts.

Further, the embodiments described herein and shown in the various flowcharts may be implemented as entirely hardware embodiments (e.g., special-purpose hardware), entirely software embodiments (e.g., processor-readable instructions), or a combination thereof. In some embodiments, software embodiments can include multiple processes or threads, launched statically or dynamically as needed, or the like.

The embodiments described herein and shown in the various flowcharts may be implemented by computer instructions (or processor-readable instructions). These computer instructions may be provided to one or more processors to produce a machine, such that execution of the instructions on the processor causes a series of operational steps to be performed to create a means for implementing the embodiments described herein and/or shown in the flowcharts. In some embodiments, these computer instructions may be stored on machine-readable storage media, such as processor-readable non-transitory storage media.

Example Computing System Implementation

Figure 10:
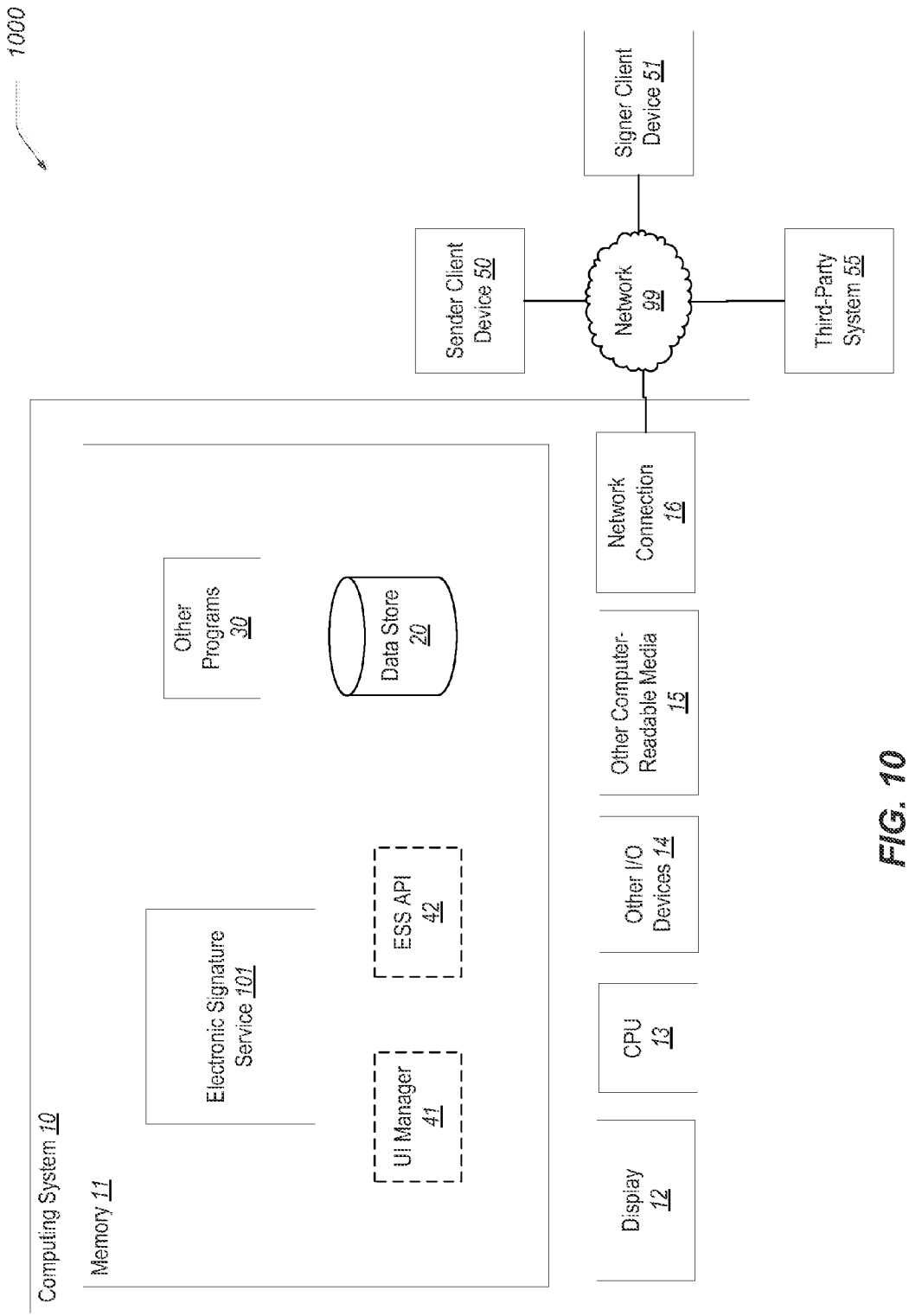
FIG. 10 is a block diagram of an example computing system for implementing example embodiments of a digital transaction management service.

FIG. 10 is a block diagram of an example computing system for implementing example embodiments of a digital transaction management service. In particular, FIG. 10 shows a system that includes computing system 10 that may be utilized to implement a DTMS 101 (e.g., as shown in FIG. 1 or 2).

Note that one or more general-purpose or special-purpose computing systems/devices may be used to implement the DTMS 101. In addition, the computing system 10 may comprise one or more distinct computing systems/devices and may span distributed locations. Furthermore, each block shown may represent one or more such blocks as appropriate to a specific embodiment or may be combined with other blocks. Also, the DTMS 101 may be implemented in software, hardware, firmware, or in some combination to achieve the capabilities described herein.

In the embodiment shown, computing system 100 comprises a computer memory 11, a display 12, one or more Central Processing Units ("CPU") 13, input/output devices 14 (e.g., keyboard, mouse, LCD display, touch screen, and the like), other computer-readable media 15, and a network connection 16 connected to a network 99.

The DTMS 101 is shown residing in memory 11. In other embodiments, some portion of the contents, some or all of the components of the DTMS 101 may be stored on and/or transmitted over the other computer-readable media 15. The components of the DTMS 101 preferably execute on one or more CPUs 13 and perform the processes described herein. Other code or programs 30 (e.g., an administrative interface, a Web server, and the like) and a data store 20, also reside in the memory 11, and preferably execute on one or more CPUs 13. Of note, one or more of the components in FIG. 10 may not be present in any specific implementation. For example, some embodiments may not provide other computer-readable media 15 or a display 12.

The DTMS 101 may perform electronic signature-related functions for or on behalf of users operating a sender client device 50 and/or a signer client device 51. In one embodiment, a sender operating sender client device 50 imports (e.g., transmits, uploads, sends) a document to be electronically signed into the DTMS 101. The DTMS 101 securely stores the document securely in data store 20. Secure document storage may include using cryptographic techniques to detect document tampering, such as generating hashes, message digests, or the like.

A signer operating the signer client device 51 may then access, review, and sign the document stored by the DTMS 101. In some embodiments, the DTMS 101 transmits images or some other representation of the document to the signer client device 51, which in turn transmits an indication of the signer's signature (or intent to sign) to the DTMS 101. The DTMS 101 then securely stores the signer's signature in association with the document in the data store 20. After signing the document, the signer using signer client device 51 can cause the DTMS 101 to provide the signed document to one or more recipients, such as via email, fax, or other mechanism.

The DTMS 101 may perform other or additional functions, such as selectively copying documents based on recipient actions and/or automatically tagging documents based on a pre-tagged document with signing roles, as described herein. Also, the DTMS 101 may provide (e.g., transmit) code modules that can be installed on the client devices 50 and/or 51 and that are configured to integrate the client devices 50 and/or 51 with the DTMS 101. As one example, the code module may be a mobile application (e.g., app) that is installed on the signer client device 51. As another example, the code module may extend the functionality of an email client or other application by adding a control (e.g., button, menu item, widget) that is configured to import, in response to selection or activation by a user, a received documents into the DTMS 101.

The illustrated example DTMS 101 may also interact with a user interface ("UI") manager 41 and an electronic signature service application program interface ("ESS API", or more simply "API") 42. The UI manager 41 and API 42 are shown in dashed lines to indicate that in other embodiments they may be provided by other, possibly remote, computing systems. The UI manager 41 provides a view and a controller that facilitate user interaction with the DTMS 101 and its various components. For example, the UI manager 41 may provide interactive access to the DTMS 101, such that users can upload or download documents for signature, review and modify documents, transmit or otherwise provide signed documents to recipients, and the like. In some embodiments, access to the functionality of the UI manager 41 may be provided via a Web server, possibly executing as one of the other programs 30. In such embodiments, a user operating a Web browser (or other client) executing on one of the client devices 50 or 51 can interact with the DTMS 101 via the UI manager 41.

The API 42 provides programmatic access to one or more functions of the DTMS 101. For example, the API 42 may provide a programmatic interface to one or more functions of the DTMS 101 that may be invoked by one of the other programs 30 or some other module. In this manner, the API 42 facilitates the development of third-party software, such as user interfaces, plug-ins, news feeds, adapters (e.g., for integrating functions of the DTMS 101 into Web applications), and the like. In addition, the API 42 may be in at least some embodiments invoked or otherwise accessed via remote entities, such as the third-party system 55, to access various functions of the DTMS 101. For example, a hosted email service executing on the third-party system 55 may provide access to the electronic signature functionality of the DTMS 101 via the API 42. As another example, an e-commerce site (e.g., online store) executing on the third-party system 55 may provide access to the electronic signature functionality of the DTMS 101 via the API 42, such as by providing a signature control/widget configured, when selected by a user, to initiate an electronic signature process as described herein.

The data store 20 is used by the other modules of the DTMS 101 to store and/or communicate information. The components of the DTMS 101 use the data store 20 to record various types of information, including documents, signatures, tracked form entries, and the like. Although the components of the DTMS 101 are described as communicating primarily through the data store 20, other communication mechanisms are contemplated, including message passing, function calls, pipes, sockets, shared memory, and the like.

The DTMS 101 interacts via the network 99 with client devices 50 and 51, and third-party systems 55. The network 99 may be any combination of one or more media (e.g., twisted pair, coaxial, fiber optic, radio frequency), hardware (e.g., routers, switches, repeaters, transceivers), and one or more protocols (e.g., TCP/IP, UDP, Ethernet, Wi-Fi, WiMAX) that facilitate communication between remotely situated humans and/or devices. In some embodiments, the network 99 may be or include multiple distinct communication channels or mechanisms (e.g., cable-based and wireless). The client devices 50 and 51 include personal computers, laptop computers, smart phones, personal digital assistants, tablet computers, kiosk systems, and the like. The third-party systems 55 and client devices 50 and 51 may be or include computing systems and/or devices constituted in a manner similar to that of computing system 100, and thus may also include displays, CPUs, other I/O devices (e.g., a camera), network connections, or the like.

In accordance with the preferred systems and processes described above, the DTMS 101 causes notification emails to be sent over the network 99 to the various devices 50, 51 or systems 55, as may be applicable in a given case.

In an example embodiment, components/modules of the DTMS 101 are implemented using standard programming techniques. For example, the DTMS 101 may be implemented as a "native" executable running on the CPU 13, along with one or more static or dynamic libraries. In other embodiments, the DTMS 101 may be implemented as instructions processed by a virtual machine that executes as one of the other programs 30. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The data store 20 may be implemented as one or more database systems, file systems, or any other technique for storing such information, or any combination of the above, including implementations using distributed computing techniques. In addition, some embodiments may provide one or more interfaces to the data stored as part of the DTMS 101. Such interfaces may be provided via database connectivity APIs accessed from a variety of programming languages, Web-based interfaces, file systems interfaces, or the like.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in certain embodiments, some or all of the components of the DTMS 101 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored in a non-transitory manner on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

While the preferred embodiment of the invention has been illustrated and described, as noted above, many changes can be made without departing from the spirit and scope of the invention. Accordingly, the scope of the invention is not limited by the disclosure of the preferred embodiment.

The embodiments of the invention in which an exclusive property or privilege is claimed are defined as follows:

1. A method for providing a notice to a user of a digital transaction management service, comprising:
   detecting, within a workspace hosted on the digital transaction management service and configured to facilitate a digital transaction between a plurality of users, a first transaction including a first electronic document tagged for an electronic signature from the user;
   sending, in response to detecting the first transaction, a first notification to the user indicating one or more electronic documents associated with the first transaction is included in the workspace with the first electronic document tagged for an electronic signature to be applied through an interface provided by the digital transaction management service, the workspace associated with the user and to provide controlled access for a plurality of users to one or more electronic documents associated with a plurality of transactions;

identifying a second transaction, pending within the workspace, associated with the user and different from the first transaction;

determining, in response to identifying the second transaction, whether the user has accessed the workspace of the digital transaction management service during a period of time and subsequent to sending the first notification to the user; and sending a second notification to the user indicating one or more electronic documents associated with the second transaction is included in the workspace of the digital transaction management service based at least in part on determining that the user has accessed the workspace of the digital transaction management service during the time period and subsequent to sending the first notification.

2. The method of claim 1, wherein sending the second notification is performed after a predetermined minimum amount of time.

3. The method of claim 2, wherein the user is a recipient and the second transaction is initiated by a sender, and further wherein the second notification is to instruct the recipient to take one or more actions with respect to the second transaction.

4. The method of claim 3, wherein the predetermined minimum amount of time is settable by the sender.

5. The method of claim 3, wherein the first transaction comprises one or more electronic documents to be reviewed by the recipient.

6. The method of claim 5, wherein the one or more actions includes electronically signing at least one of the one or more electronic documents.

7. The method of claim 1, further comprising:
sending a reminder notification to the user identifying at least the first transaction based on the time period elapsing.

8. The method of claim 1, wherein the first notification directs the user to a remote computer page associated with the digital transaction management service, the remote computer page displaying a plurality of transactions associated with the user including the first transaction and the second transaction, the method further comprising:
sending a reminder notification to the user identifying the plurality of transactions based on the time period elapsing.

9. The method of claim 8, wherein each of the plurality of transactions comprises one or more electronic documents to be reviewed by the user.

10. The method of claim 9, wherein the reminder notification instructs the recipient to take one or more actions with respect at least one of the plurality of transactions, and the one or more actions includes electronically signing at least one of the one or more documents.

11. A system that facilitates a digital transaction between at least two users, including a sender and a recipient, the system comprising:
at least one network device, comprising:
a computer processor; and
a memory for storing instructions operable by the computer processor, the instructions, when operated by the processor, causing the processor to:

detect, within a workspace hosted on the digital transaction management service and configured to facilitate a digital transaction between the at least two users, a first transaction including a first electronic document tagged for an electronic signature from the recipient;

send, in response to detecting the first transaction, a first notification to the recipient indicating one or more electronic documents associated with the first transaction is included in the workspace with the first electronic document tagged for an electronic signature to be applied through an interface provided by the digital transaction management service, the workspace associated with the recipient and to provide controlled access for at least the sender and recipient to one or more electronic documents associated with a plurality of transactions;

identify a second transaction, pending within the workspace, associated with the recipient and different from the first transaction;

determine, in response to identifying the second transaction, whether the recipient has accessed the workspace of the digital transaction management service during a period of time and subsequent to sending the first notification to the recipient; and send a second notification to the recipient indicating one or more documents associated with the second transaction is included in the workspace of the digital transaction management service based at least in part on determining that the recipient has accessed the workspace of the digital transaction management service during the time period and subsequent to sending the first notification.

12. The system of claim 11, wherein the stored instructions further cause the processor to:
send the second notification a predetermined minimum amount of time.

13. The system of claim 12, wherein the stored instructions further cause the processor to adjust the predetermined minimum amount of time in response to receipt of an input by the sender.

14. The system of claim 12, wherein at least one of the first notification or the second notification identifies one or more actions associated with the first transaction or the second transaction, respectively, and wherein the one or more actions includes electronically signing at least one of the one or more documents associated with the respective transaction.

15. The system of claim 11 wherein the stored instructions further cause the processor to:
send a reminder notice to the recipient based on a time period elapsing.

16. A non-transitory computer-readable storage medium comprising contents that, when executed by a computing device, cause the computing device to perform operations including:
detect, within a workspace hosted on the digital transaction management service and configured to facilitate a digital transaction between a plurality of users, a first transaction including a first electronic document tagged for an electronic signature from the user, send, in response to detecting the first transaction, a first notification to the user indicating one or more electronic documents associated with the first transaction is included in the workspace with the first electronic document tagged for an electronic signature to be applied through an interface provided by the digital transaction management service, the workspace associated with the user and to provide controlled access for a plurality of users to one or more electronic documents associated with a plurality of transactions;

identify a second transaction, pending within the workspace, associated with the user and different from the first transaction;

determine, in response to identifying the second transaction, whether the user has accessed the workspace of the digital transaction management service during a period of time and subsequent to sending the first notification to the user; and send a second notification to the user indicating one or more electronic documents associated with the new second transaction is included in the workspace of the digital transaction management service based at least in part on determining that the user has accessed the workspace of the digital transaction management service during the time period and subsequent to sending the first notification.

\* \* \* \* \*

UNITED STATES PATENT AND TRADEMARK OFFICE
CERTIFICATE OF CORRECTION

PATENT NO.         : 9,798,709 B2
APPLICATION NO.    : 14/610122
DATED              : October 24, 2017
INVENTOR(S)        : Malden Page 1 of 1

It is certified that error appears in the above-identified patent and that said Letters Patent is hereby corrected as shown below:

On the Title Page

Item (72) Inventor is corrected to read:
-- Matthew Scott Malden, San Mateo (CA) --.

Signed and Sealed this
Thirtieth Day of April, 2019

Andrei Iancu
*Director of the United States Patent and Trademark Office*